Figure 1:
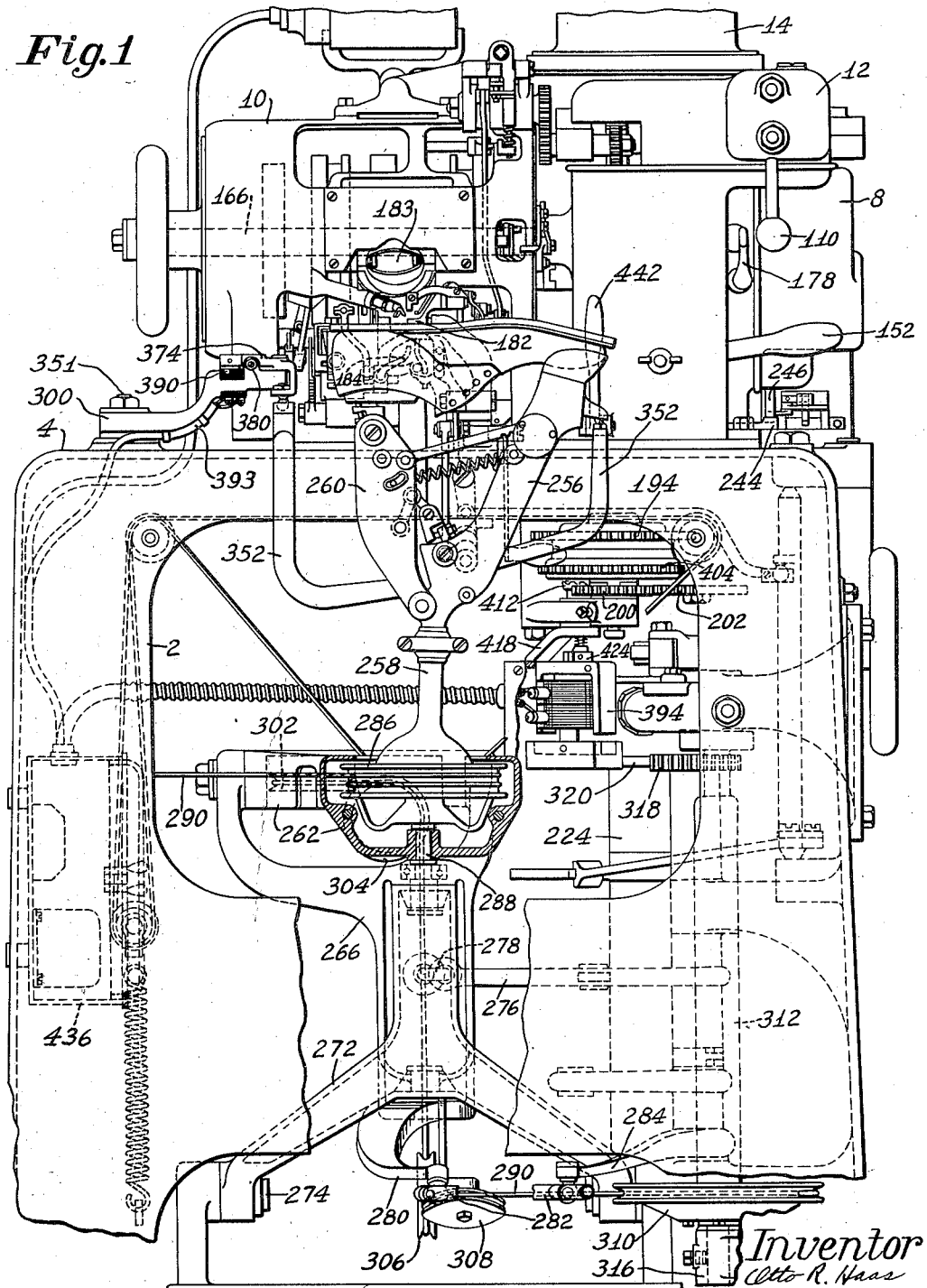

May 11, 1937.    O. R. HAAS    2,080,076
SHOE MACHINE
Original Filed March 19, 1932    11 Sheets-Sheet 3

Witness
Chas. T. Olson

Inventor
Otto R. Haas
by Fish Hildreth
Cary & Jenney Attys.

May 11, 1937.  O. R. HAAS  2,080,076
SHOE MACHINE
Original Filed March 19, 1932   11 Sheets-Sheet 4

Witness
Chas. T. Olson

Inventor
Otto R. Haas
by Fish Hildreth
Cay & Jenney Attys

May 11, 1937.  O. R. HAAS  2,080,076
SHOE MACHINE
Original Filed March 19, 1932  11 Sheets-Sheet 5

Witness
Chas. T. Olson

Inventor
Otto R. Haas
by Fish Hildreth
Cary & Jenney Attys

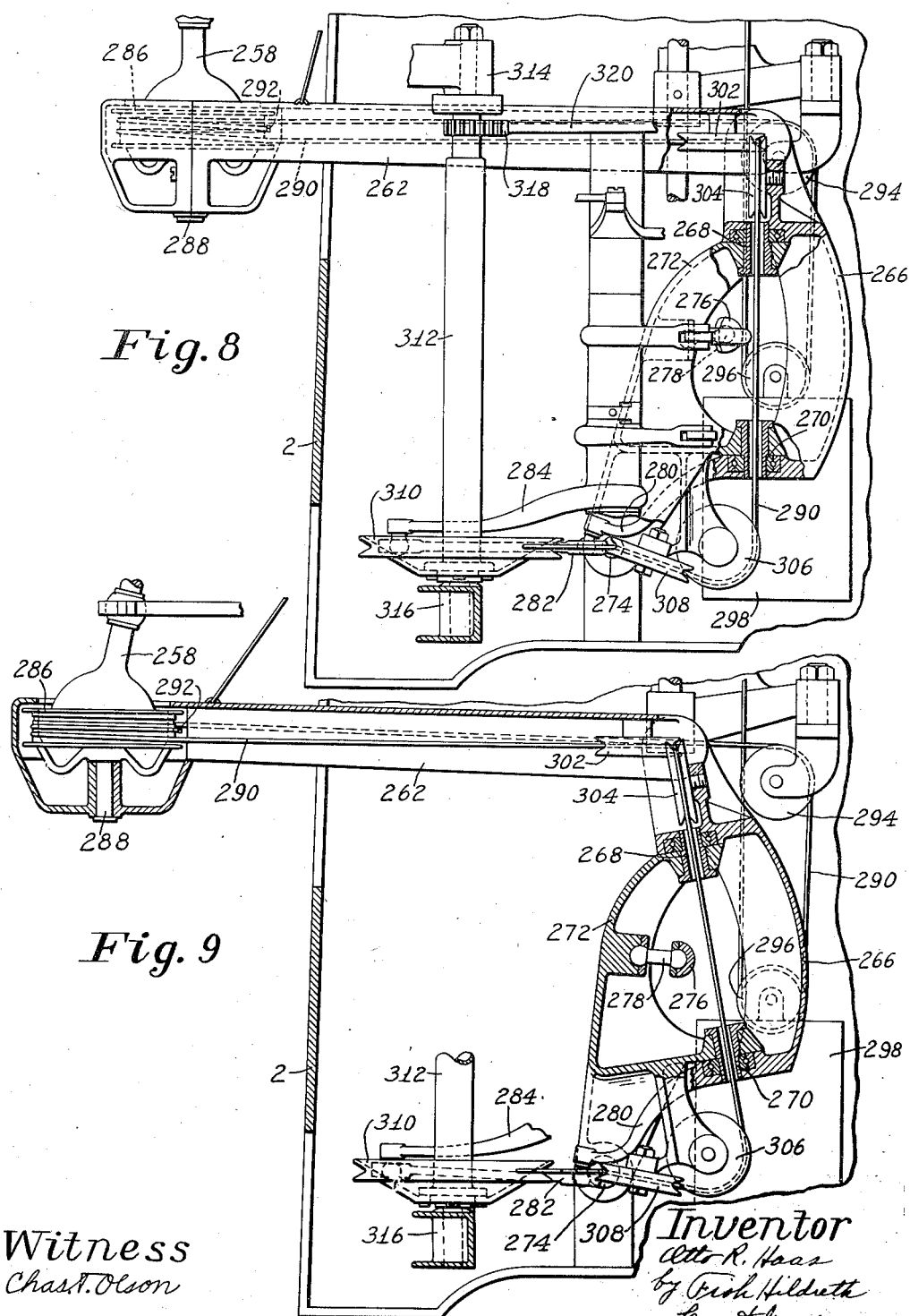

May 11, 1937.  O. R. HAAS  2,080,076

SHOE MACHINE

Original Filed March 19, 1932   11 Sheets-Sheet 9

Witness
Chas. F. Olson

Inventor
Otto R. Haas
by Fish Hildreth
Cary & Jenney Attys

May 11, 1937.  O. R. HAAS  2,080,076
SHOE MACHINE
Original Filed March 19, 1932    11 Sheets-Sheet 10
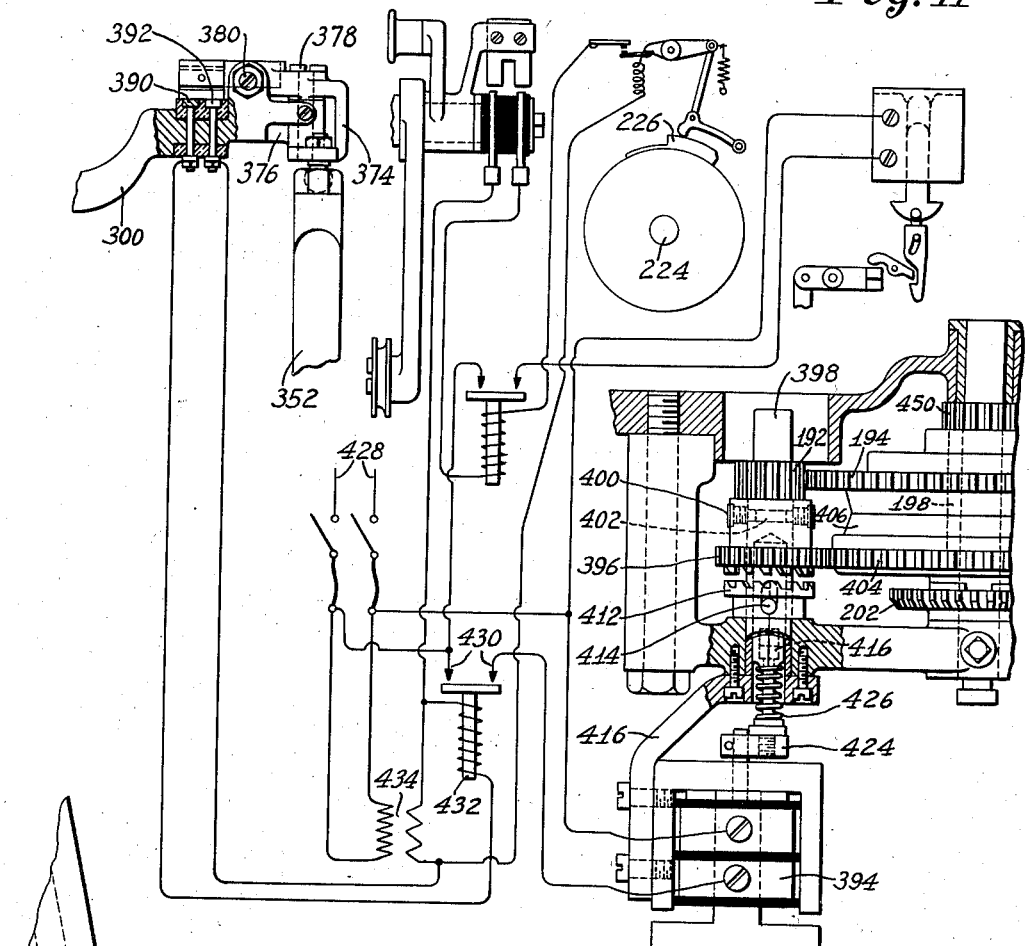
Fig. 11
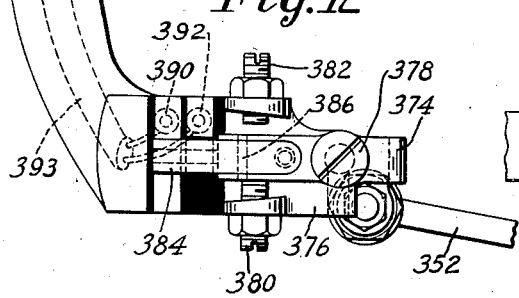
Fig. 12
Fig. 13
Witness
Chas. T. Olson
Inventor
Otto R. Haas
by Fish Hildreth
Cary & Jenney Attys.

Patented May 11, 1937

2,080,076

UNITED STATES PATENT OFFICE 2,080,076

SHOE MACHINE

Otto R. Haas, North Beverly, Mass., assignor to United Shoe Machinery Corporation, Paterson, N. J., a corporation of New Jersey Original application March 19, 1932, Serial No. 600,016. Divided and this application May 1, 1935, Serial No. 19,211

26 Claims. (Cl. 12—17)

The present invention relates to shoe machines and is herein set forth as embodied in an outsole stitcher of the type in which the shoe and the stitch forming devices are moved relatively to transfer the point of operation about the shoe and to change the relative positions of the shoe and the operating means to present the shoe properly to the operating means as the point of operation is transferred about the shoe, and in which the shoe is supported in operating position in the machine, and all of its movements are effected and controlled by automatically acting mechanisms. A machine of this type is disclosed in applicant's prior Patent No. 2,031,479, granted February 18, 1936 on an application Serial No. 600,016, for Shoe sewing machines, filed March 19, 1932, of which the present application is a division.

The primary object of the present invention is to improve the construction and mode of operation of automatic outsole shoe sewing machines and to produce a machine of this type which is more efficient, reliable and uniform in its operation than prior machines and upon which an operation on a shoe may be successfully performed by a comparatively unskilled operator with a minimum expenditure of labor and time. Certain features of the invention may be utilized to advantage in connection with shoe sewing machines other than outsole stitchers, or in connection with machines for performing other shoe making operations. Also, certain features are not limited to use in machines which are wholly automatic in character, but may be embodied in machines in which, at least some of the required relative movements of the operating instrumentalities and shoe are produced or controlled by the operator.

In operating prior automatic shoe machines, considerable manual effort has been required to set the machine in operation due to the frictional resistance of the starting mechanism, to the necessary mass of the manipulated parts and to the number of different operations performed simultaneously or in timed relation to the coupling of the rotating parts to the power driver.

An important feature of the present invention, therefore, contemplates the provision of a manually controlled power driven starting apparatus for coupling a shoe machine to a power driving member to relieve the operator of the physical exertion which would otherwise be required and to insure uniform and certain actuation of the coupling parts in suitable timed relation to any secondary operations that may be required or considered desirable. In the machine hereinafter described this feature of the invention is embodied in a construction comprising a power driving member, a main driven member, a main clutch for coupling the driving member to the driven member, an auxiliary shaft, an auxiliary clutch for coupling the auxiliary shaft to actuate the main clutch, and a manual control for causing the engagement of the auxiliary clutch. In the construction hereinafter described, this auxiliary shaft, in addition to causing the actuation of the main clutch is also utilized for performing certain preliminary operations to place the various parts of the machine in proper position to act on the shoe when the machine is started. The machine in which the several features of the present invention have been embodied is an automatic outsole stitcher and, in this machine, the preliminary operations performed by the auxiliary shaft during or prior to the throwing in of the main clutch consist in locking a portion of the jack actuating mechanism, which has been adjusted in accordance with the size of the shoe by the movement of the shoe into the machine and in adjusting a portion of the driving mechanism for operation on the size of shoe which is in the jack.

The automatic machine hereinafter described is of that type which comprises a jack upon which the shoe to be operated upon is supported and to which positioning movements are imparted to cause the shoe to be presented properly to the operating means as the point of operation is transferred about the shoe. In machines of this type, the jack is rotatably mounted upon a jack supporting structure consisting of a plurality of members pivotally connected to swing about a plurality of axes. A feature of the present invention relates to an improved jack supporting structure and means for imparting the required positioning movements to the jack and more particularly to an improved construction and arrangement of parts for producing and controlling the rotating movements of the jack. In prior construction the rotary movements of the jack have been produced and controlled by means of a cable leading from a power actuated drum, mounted in the frame of the machine, over guiding pulleys on the jack supporting structure to a pulley at the lower end of the jack. In order to improve and simplify this jack rotating mechanism and to enable the jack to be rotated and its rotative position controlled in a uniform and accurate manner, regardless of any jack positioning movements which may be imparted to the swinging members of the jack supporting structure, this feature of the invention contemplates providing guides for the cable so that on its way from the power actuated drum on the frame of the machine to the pulley on the jack, it passes through the axes about which the pivoted members of the support swing. By arranging the guides so that the cable passes through the axes about which the pivoted members of the jack support swing, the length of cable between the pulley at the lower end of the jack and the power actuated drum on the frame of the machine remains constant, being unaffected by any swinging movements which may be imparted to the jack support in any direction, and thus the rotative movements of the jack and its rotative position can be accurately and uniformly produced and controlled to maintain the edge of the shoe sole at the sewing point always parallel to the line of feed, and the production of an outseam properly located on the shoe and stitches of uniform length can be insured.

In an automatic shoe machine in which the feeding devices operate directly on the shoe, it is necessary or desirable to provide means whereby the shoe may be kept in time with the position changing mechanism which operates to cause the shoe to be presented properly to the operating devices as the point of operation is transferred along the shoe. A feature of the present invention is embodied in an improved mechanism for securing this result and, as hereinafter described, comprises a change speed gearing in the connections for driving the pattern cam shaft from which positioning movements are imparted to the jack.

The features of invention above referred to and other novel constructions, combinations and arrangements of parts hereinafter described and claimed will be readily understood by those skilled in the art from the following description taken in connection with the accompanying drawings which illustrate an automatic outsole stitcher constituting one specific embodiment of the several features of the invention.

Figure 2:
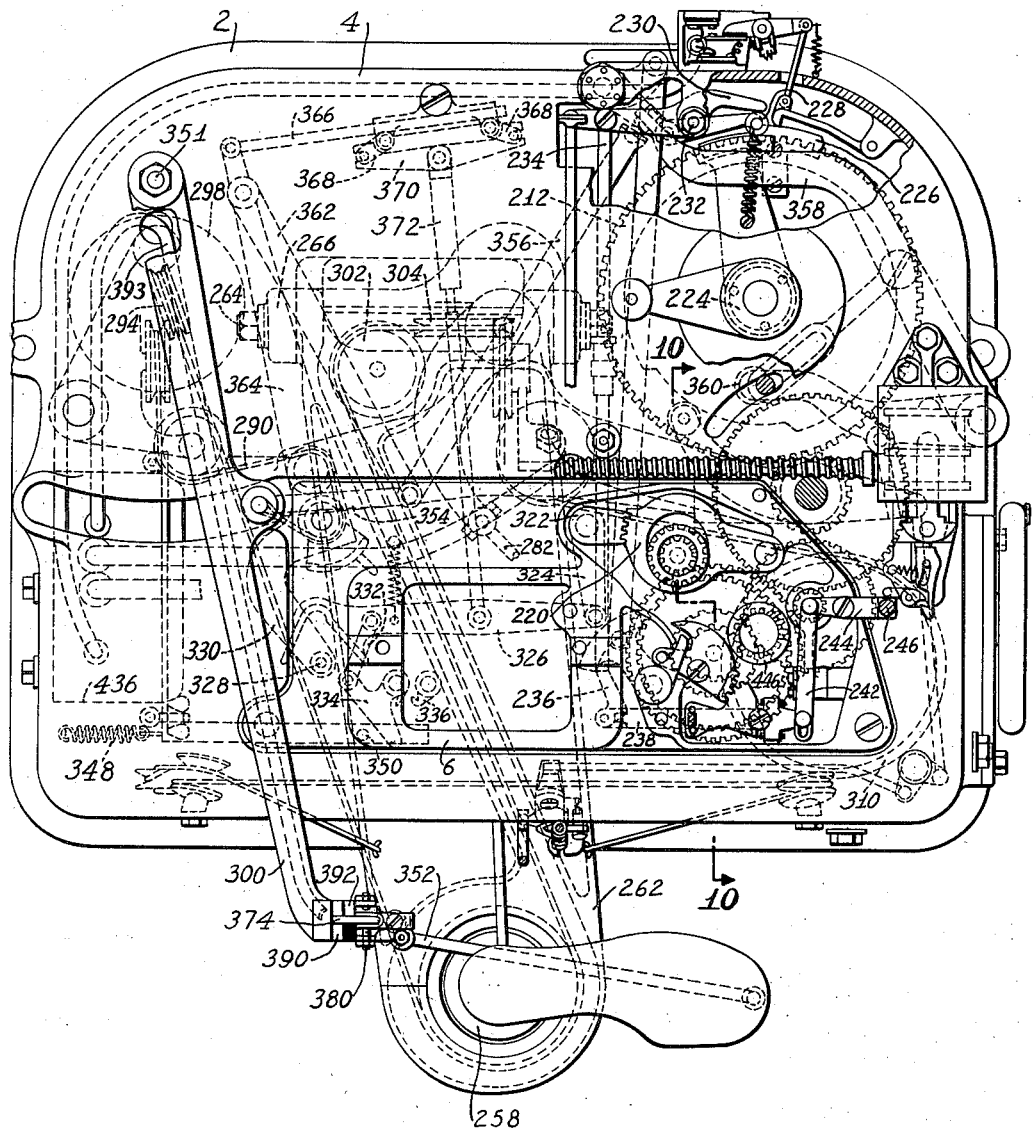
Figure 3:
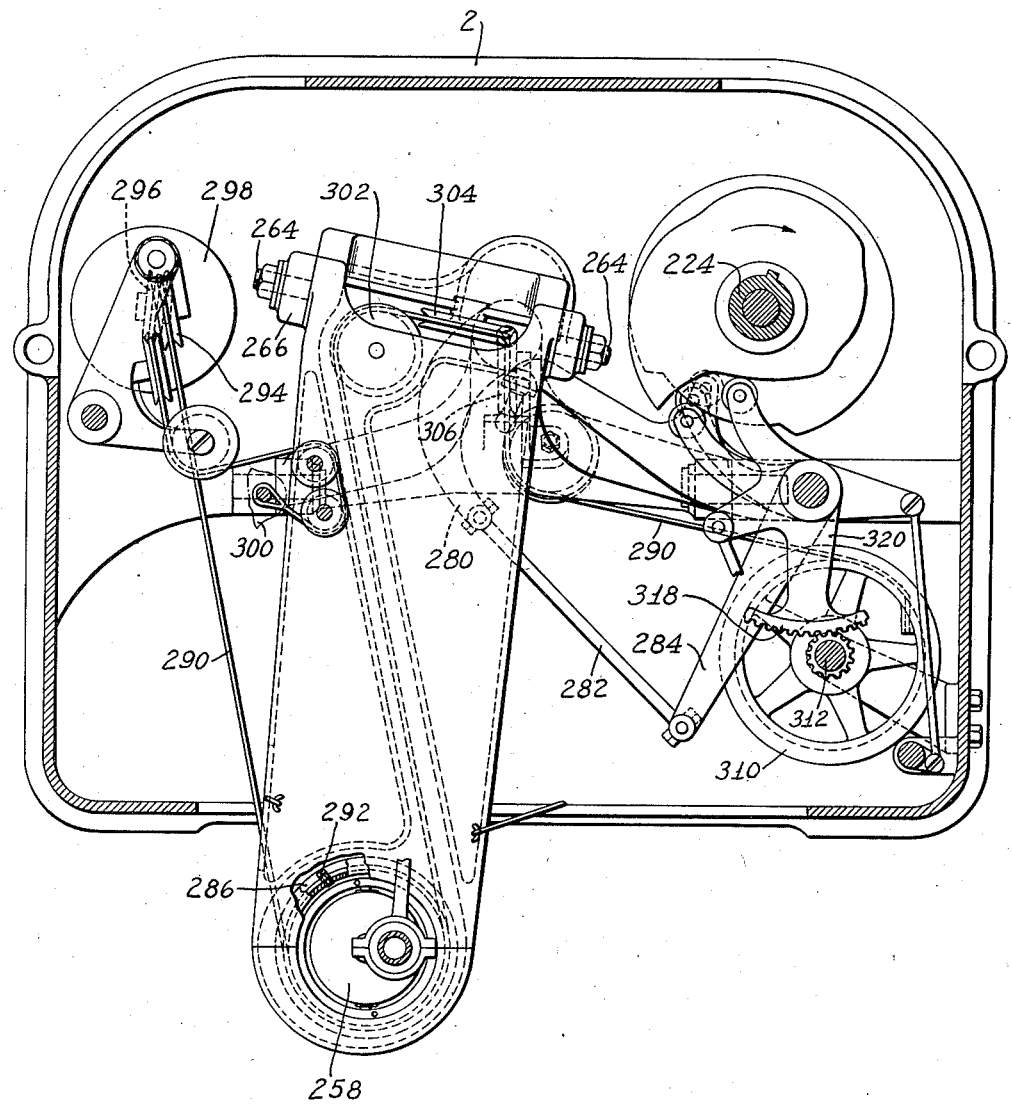
Figure 4:
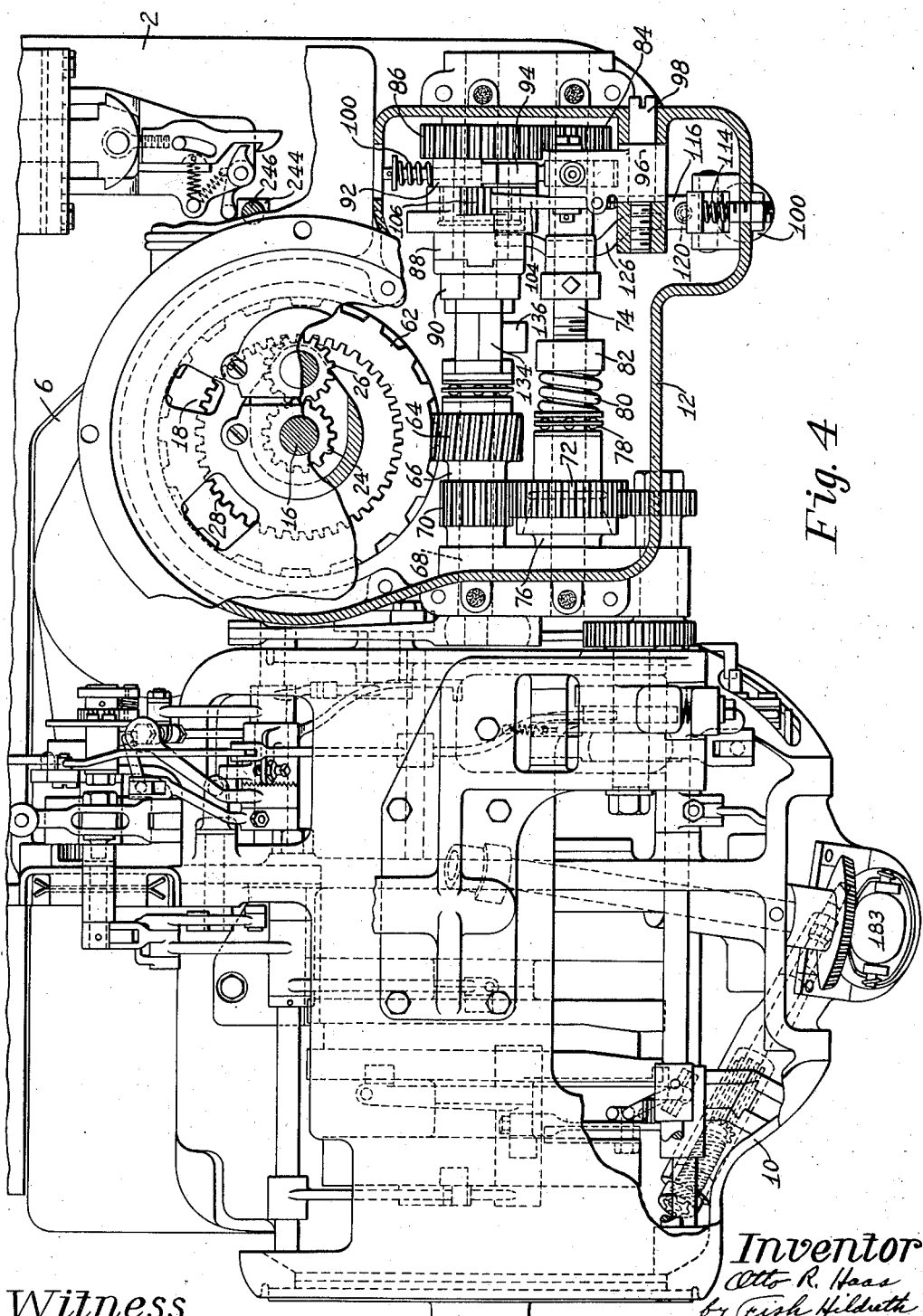
Figure 5:
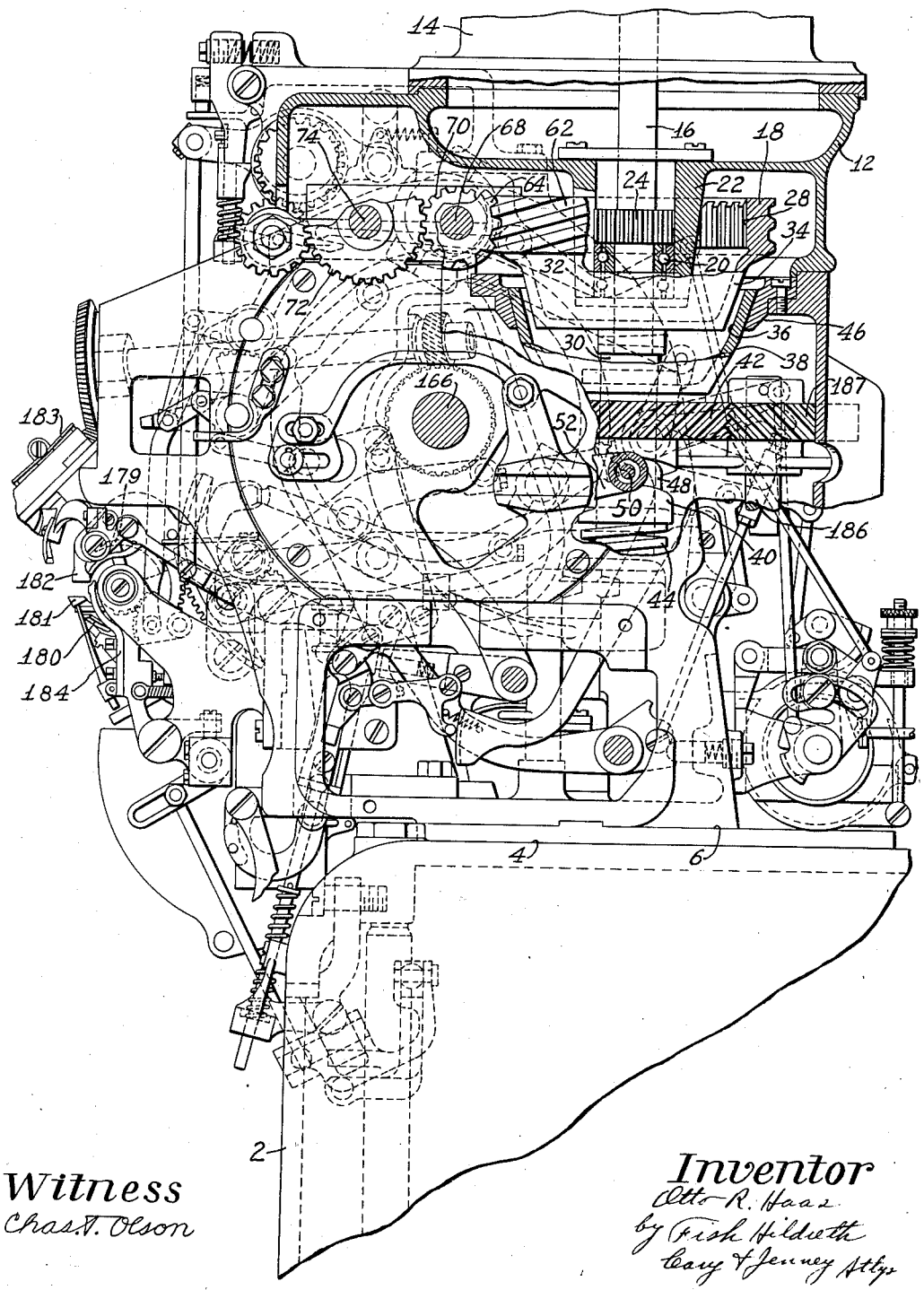
Figure 6:
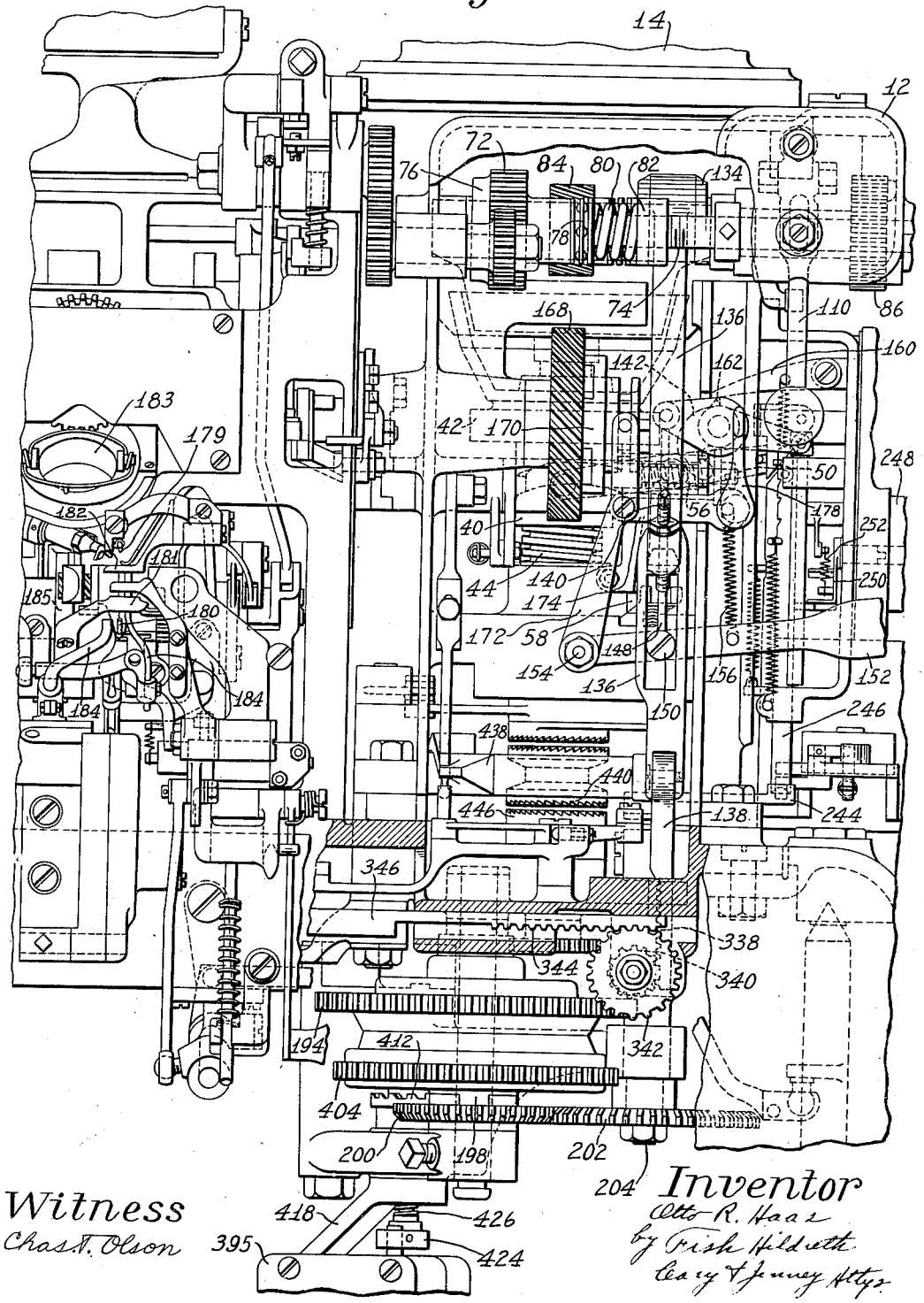
Figure 7:
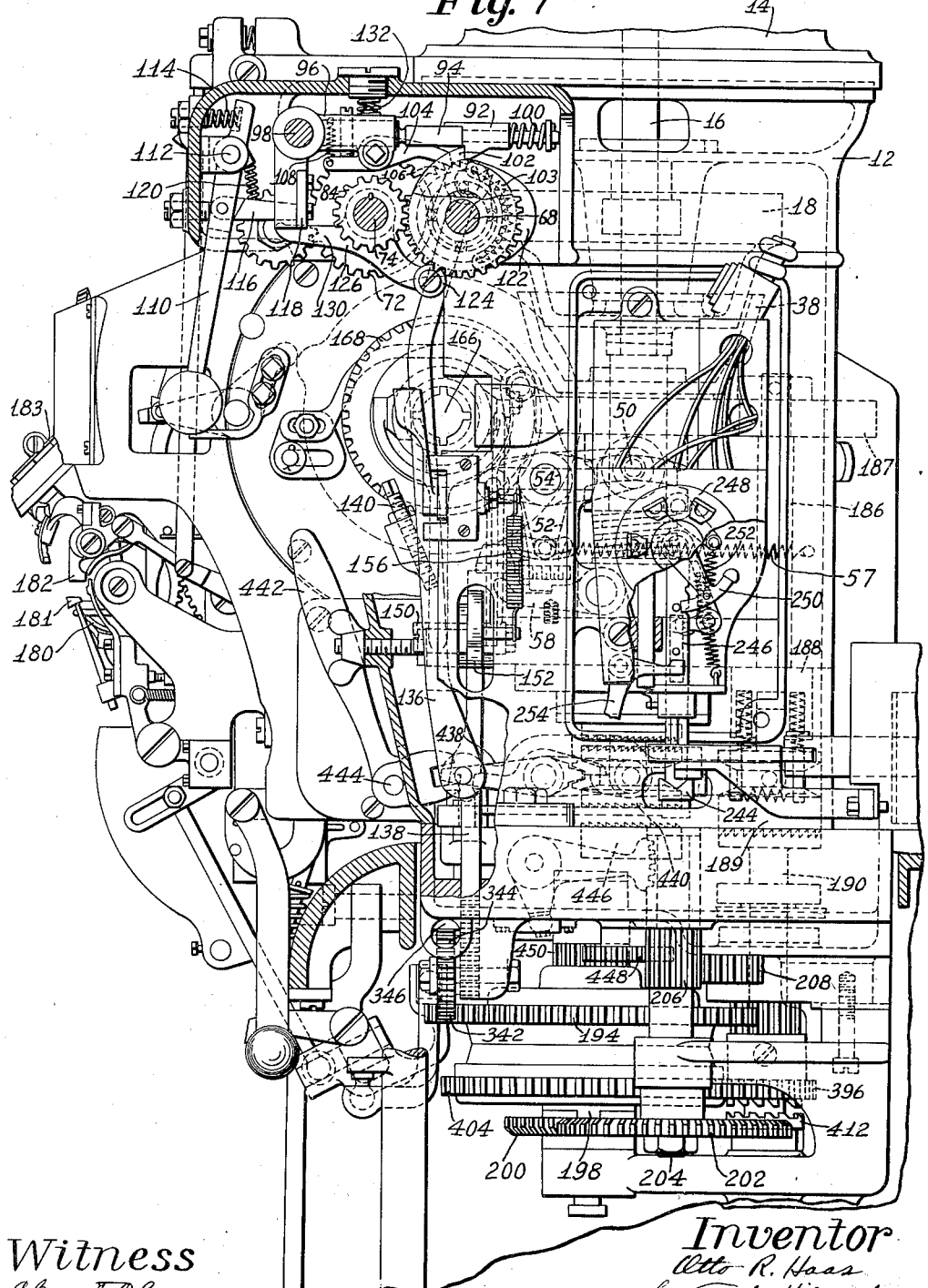
Figure 10:
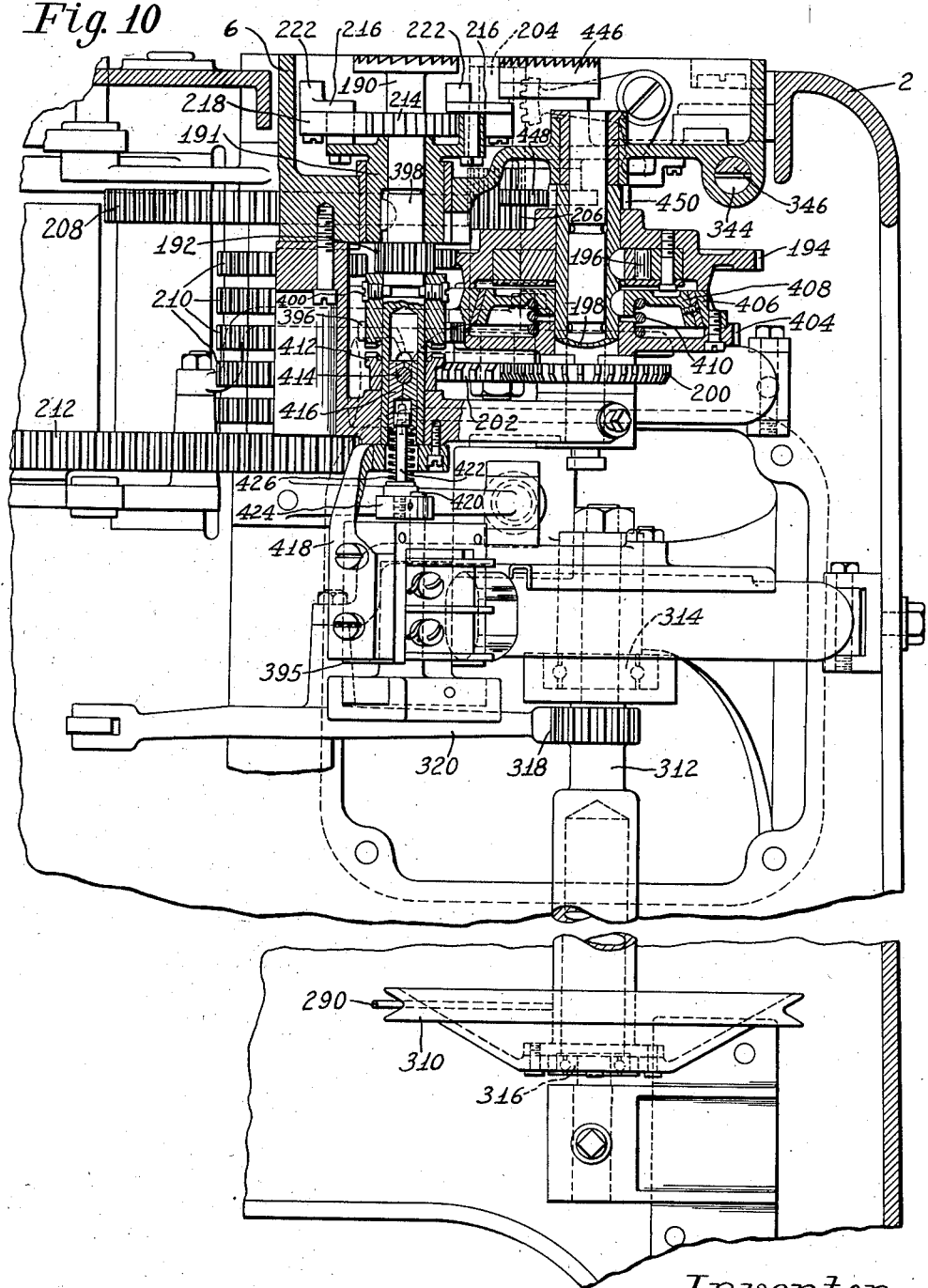
Figures 14, 15:
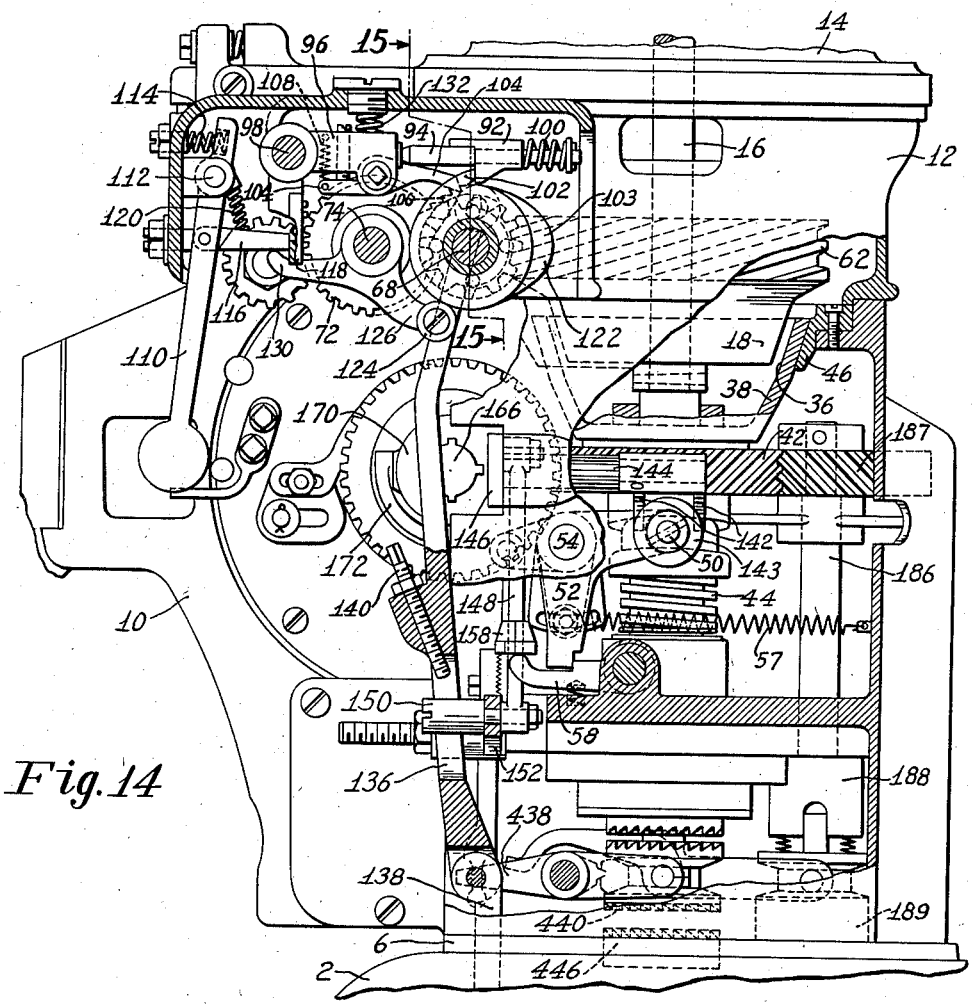

In the drawings Figure 1 is a view in front elevation of a complete automatic outsole stitcher embodying the several features of the invention with the lower portion of the main base, the motor, and certain other parts broken off; Figure 2 is a plan view of the machine with the frames for the power drive and sewing mechanism removed, and with the base partly broken away to show the construction and mechanism within the base; Figure 3 is a sectional plan view of the machine on a plane passing just below the top of the base, parts having been removed to simplify illustration; Figure 4 is a plan view, partially in section on an enlarged scale showing the mechanism below the motor and parts of the sewing mechanisms; Figure 5 is a view in elevation of the upper portion of the machine from the right side, partly in section, illustrating particularly the driving and stopping mechanism; Figure 6 is a view in front elevation, partly in section of an upper portion of the machine; Figure 7 is a view similar to Figure 5, parts having been broken away and shown in section along a plane passing through the machine nearer to the right side; Figures 8 and 9 are sectional views in side elevation of a portion of the jack supporting and actuating mechanisms in different positions on the same scale as Figure 2; Figure 10 is a side sectional view taken along the line 10—10 of Figure 2; Figure 11 illustrates diagrammatically a wiring system for electrically connecting various parts of the machine; Figure 12 is a detail plan view of a lost motion switch; Figure 13 is a sectional view in front elevation of the switch indicated in Figure 12; Figure 14 is a detail view showing, in side elevation and section, certain of the parts connected with the driving and stopping mechanism; and Figure 15 is a detail sectional view taken along the line 15—15 of Figure 14.

Referring to Figures 1 and 2 of the drawings, the frame of the machine comprises a main base 2 having a horizontal top 4. Suspended through an opening in the top is a cradle 6, machined to carry the frames 8 and 10 for the power drive and the sewing mechanism, respectively. The power drive frame 8 supports a casting 12 carrying the power starting mechanism, and a driving motor 14 is attached to a flange at the top of the power starting casting.

The motor 14 is mounted to drive a vertical shaft 16 (see Figs. 4, 5, and 7), for operating the constantly rotating main power driver, indicated at 18. The upper end of shaft 16 is supported within the motor and the lower end, by a bearing 20 carried by a sleeve 22 formed in the power starting casting 12. The connection between the motor shaft 16 and the power driver 18 comprises a spur gear 24 fixed to the motor shaft 16 which meshes with and drives an idler gear 26 rotating on a fixed shaft and meshing with an internal gear 28 formed on the power driver 18. The power driver is continuously rotated by the motor and is pinned to the upper end of a vertical shaft 30 held in alignment by a radial bearing 32 with the end of the motor shaft 16.

The power driver 18 is formed at its lower portion with a conical clutching surface 34 for engaging a correspondingly shaped internal clutching surface 36 on a driven clutch member 38. The clutch member 38 extends upwardly from a sleeve 40 freely slidable and rotatable on the shaft 30 and provided with an integrally formed helical gear 42 at its central portion for driving a sewing cam shaft and a pattern cam shaft of the machine. The driven clutch member 38 is held in engagement with the clutching surface of the power driver by a heavy compression spring 44 between the sleeve 40 and a bearing carried by the power drive frame. The outside surface of the driven clutch member is also conical in shape and is adapted to engage an annular braking member 46 attached to the frame of the machine.

Means are provided for disengaging the driven clutch member from the main driver at the proper time and wedging it within the braking member 46 to arrest the movement of the helical gear 42 and the sewing cam shaft and pattern cam shaft driven thereby. These means are substantially the same as in the driving and stopping mechanism described in the U. S. patent to Topham No. 1,791,176 granted February 3, 1931, and comprise a suitably shaped cam slot 48 formed in the sleeve 40 for engagement with a spring pressed lock bolt 50. The lock bolt is mounted in a carrier 52 rigidly secured to a horizontal rock shaft 54 mounted in the frame of the power drive. The lock bolt 50 is mounted to slide in an arm of the carrier and is urged toward the cam slot 48 by a spring 56 (see Fig. 6).

While the machine is in operation and while the sewing and pattern cam shafts are being driven, the lock bolt 50 is out of engagement with the cam slot 48, and the clutch member 38 is held in engagement with the power driver 18 by the force exerted by the spring 44 on the sleeve 40. To disengage the driven clutch member from the power driver, the lock bolt is allowed to engage the cam slot 48 in the sleeve 40 and, at a certain point in the revolution of the sleeve, the carrier for the bolt is held against movement, thereby causing the lock bolt and cam groove to cooperate in forcing the sleeve 40 with the clutch member 36 away from the power driver against the force of the spring 44, and bringing the brake surface on the driven clutch member into engagement with the fixed braking member 46. While the clutch members are in engagement, the horizontal arm of the carrier in which the bolt is mounted is maintained in raised position by a spring 57 stretched between the vertical arm of the carrier and the frame of the machine. When the lock bolt is allowed to move toward the cam slot, it engages the outer surface of the sleeve 40 and slides into the slot when the slot registers with the bolt. Continued rotation of the clutch member causes the lock bolt to be moved downwardly and the lock bolt carrier to be moved in a clockwise direction. Movement of the lock bolt carrier in a counter-clockwise direction, and movement of the lock bolt in an upward direction is then prevented by the engagement of the vertical arm of the lock bolt carrier by a spring pressed latch 58 (Fig. 14.) The lock bolt carrier with the lock bolt 50 is then held against movement and the continued rotation of the sleeve 40 causes the separation of the clutch members by the cooperative action of the cam slot 48 and the stationarily held lock bolt 50.

Outsole shoe sewing machines of the character herein described are heavily constructed and of considerable mass, requiring a heavy braking force to be applied in stopping at a definite point. This force is at a maximum with the parts in a stopped position and produces a large amount of frictional resistance to the releasing movement of the latch 58 from engagement with the bolt carrier. To relieve the operator from the exertion necessary to overcome this resistance, starting mechanism is provided in accordance with a feature of the present invention to supply an unlimited amount of power for application in releasing the latch. This mechanism comprises a helical gear 62 (see Figs. 4 and 5) on the power driver 18 engaging a gear 64 formed on a sleeve 66 rotating freely on a horizontal crank shaft 68 (Fig. 15) journaled in the power starting casing, from which shaft through connections, hereinafter described, the latch 58 is actuated to release the lock bolt carrier and the lock bolt is withdrawn from the cam slot 48. Beside the gear 64 on the sleeve 66 there is a spur gear 70 meshed with a gear 72 rotatable on a horizontal counter-shaft 74, also having bearings in the casting 12. The gear 72 is formed with a conical opening at one side and a correspondingly shaped hub member 76 fixed to the counter-shaft 74 enters into frictional engagement with the inner surface of gear 72. At the opposite side of the gear, a thrust bearing 78 reacts against a compression spring 80, to prevent slippage between the hub member and the gear 72. The outer end of spring 80 is backed by an adjustable collar 82 threaded onto the shaft 74. At the end of the counter-shaft opposite from the gear 72, is fixed a spur gear 84 meshing with a gear 86 mounted loosely on the crank shaft 68 and comprising the driving part of an auxiliary Horton or other one-revolution clutch. The driven part 88 of the clutch is keyed to a collar 90 fixed on the crank shaft 68. The gear 86 is continuously rotated by the train of gears, thus described, including the helical gear 62 on the main driver, gears 64 and 70 on the crank shaft 68, gear 72 rotating with the counter-shaft 74, and gear 84 meshing with gear 86.

The one-revolution clutch is held in uncoupled condition by a slidable abutment 92 (see Figs. 4 and 7) carried on a rod 94 extending from a bell crank 96 pivoted to the power starting casting 12 by a screw 98. The abutment 92 is yieldingly maintained in position by a spring 100 for absorbing the shock which results from the stopping action of a projection 102 from the control disk 103 of the clutch. Pivotally mounted on the bell crank 96 is a pawl member 104 engaging with ratchet teeth 106, on the driven part 88 of the clutch. This pawl aids in maintaining the clutch in released condition by preventing reverse rotation of the driven parts. The pawl is resiliently maintained in contact with the ratchet teeth by a spring 108 tensed between the forward end of the pawl and the bell crank.

To enable the crank shaft to be operated, the constantly rotating gear 86 is coupled with the driven part 88 of the one-revolution clutch by rocking the bell crank 96 about its pivot screw 98, thereby moving the slidable abutment 92 out of contact with the projection 102 on the control disk of the clutch and connecting the driving gear 86 with the crank shaft 68 through one complete revolution. The bell crank 96 is rocked by means of a manually operated handle 110 pivoted at 112 on the power starting frame, the lower end being thrust outwardly by a compression spring 114 acting between the upper end of the handle and the frame. To prevent more than one revolution of the crank shaft for a single actuation of the manually operated handle 110, a latch 116 is pivotally mounted on the handle and extends into contact with a projection 118 on the lower arm of the bell crank 96. A spring 120 extends between the handle 110 and the latch 116 to force it downwardly and hold it in a substantially horizontal position with a shoulder on the latch in engagement with the side of the handle. Manual operation of the handle 110 thrusts the latch 116 endwise against the projection 118 to rock the bell crank and release the projection on the clutch from the abutment 92. To prevent the crank shaft 68 from making more than one revolution, the driven part 88 of the clutch carries a cam 122 and, upon rotation of the crank shaft, the cam engages a roller 124 attached to the end of a release trigger 126 fulcrumed loosely at its central part on the counter-shaft 74. As the roller 124 is thrust downwardly by the cam 122, the other end 130 of the trigger rises to strike the latch 116 near its free end and lifts it from engagement with the projection 118 on the bell crank. As soon as the projection 118 is cleared by the latch 116, the abutment 92 falls into the path of the projection 102 under the action of a spring 132 compressed between the horizontal arm of the bell crank and the casting frame. As the crank shaft continues to rotate, the projection 102 strikes abutment 92 and the auxiliary clutch is again uncoupled.

Rotation of the crank shaft actuates the lock bolt 50 and the carrier latch 58 to free the main driven clutch member 38 from engagement with the stationary brake and allow it to rise under the pressure of the compression spring, into driving relation with the power driver 18. For this purpose, the crank shaft 68 is provided with a crank 134 which actuates a vertical pitman 136 connected at its lower end with a vertical slide 138 (see Figs. 6 and 7). At an intermediate part of the pitman there are provided an opening and a lug carrying a vertically adjustable stop screw 140. The latch 58 is released from the lock bolt carrier and the lock bolt 50 is withdrawn from engagement with the cam slot 48 by the action of the stop screw 140 through connections which are substantially the same as disclosed in Patent No. 1,791,176 and which comprise a pair of fingers 142 rotatable with a shaft 144 (see Fig. 14) journaled in the frame of the machine. These fingers thrust against a collar 143 at the end of the clutch bolt to withdraw it. The shaft 144 is rotated by an arm 146 fixed to one end of the shaft and connected at its outer end to a link 148. The lower end of the link is pivotally connected by screw 150 to a horizontal lever 152 pivoted at 154 to the frame of the machine, the extending end of which lever is fashioned with a handle portion to provide for manual actuation, and is connected by an upwardly extending spring 156 for maintaining it in raised position so that the fingers 142 will not normally engage the collar at the end of the clutch bolt 50. The link 148 also carries a camp block 158 adjustable longitudinally of the link. This camp block is adjusted to release the latch 58 from the bolt carrier by striking a pair of fingers extending from the latch, which project at either side of the link 148. The screw 150 is formed with an elongated head portion to enter the slot in the pitman 136 and as the pitman descends during rotation of the crank shaft, stop screw 140 strikes the head of screw 150 (see Fig. 7), causing a release of the latch 58 from the bolt carrier and a withdrawal of the bolt 50 from engagement with the cam slot 48 in the driven clutch member 38. As soon as the driven clutch member is released, it moves upwardly under the action of the compression spring 44 into driving relation with the main driver 18 to set the machine in operation. The fingers 142 are retained in clutch releasing position by a pivoted latch 160 acting against a projection 162 on one of the fingers. A spring is stretched between the latch and the frame of the machine to hold the latch 160 in engagement with the projection on the finger.

Manual operation of the handle 110 causes a single rotation of the crank shaft 68 and a reciprocation of the pitman 136 to move link 148 downwardly to release the main driven clutch member and start the machine. If the parts become so tightly wedged that breakage is imminent, gear 72 runs idly on the countershaft 74, exerting only the turning force provided by the frictional engagement with the conical hub member 76.

The sewing mechanism and the jack actuating mechanisms are driven by the driven clutch member 38 through two separate transmission systems as in the machine disclosed in the patent to Morrill No. 1,834,471, dated December 1, 1931. In the present construction, however, a helical gear 168 which meshes with the gear 42 formed on the sleeve 40 of the driving clutch member is mounted to rotate freely on the main horizontal sewing cam shaft 166 and is detachably connected to the shaft by means of a clutch member 170 mounted to rotate with and slide longitudinally on the shaft and provided with clutch projections engaging cooperating projections on the face of the gear 168. The clutch member 170 may be moved out of engagement with the gear 168 by means of a clutch shifting member 172 fulcrumed to swing about the pivot 154 on which the lever 152 is mounted, and connected by a short horizontal link 174 with an eccentric pin on the pivot of a hand lever 178.

The stitch-forming devices (see Figs. 1, 5, and 6) include the curved hook needle, indicated at 179, the awl at 180, the work support at 181, the presser-foot at 182, the shuttle at 183, and the looper at 184. The work feeding devices of the machine are constructed and arranged to impart a continuous feeding movement to the work, and to this end the work support and presser-foot are mounted upon a laterally sliding carriage or feed slide 185, and the needle and awl are also mounted upon this carriage but, at certain times during the stitch-forming and work-feeding cycle, are moved in the line of feed independently of the carriage.

The jack actuating mechanisms are driven from the gear 42 on the driven clutch member through a vertical shaft 186 (see Figs. 5 and 7) carrying a helical gear 187 at its upper end, meshing with the gear 42 and terminating in a slotted enlargement 188 at its lower end. Below the end of the enlargement, a serrated clutch block 189 is arranged with a key slidable in a slot axially of the shaft. Springs maintain the block in a lowered position against the upper toothed surface of an enlarged upper end of a short vertical shaft 190 (see Fig. 10). Surrounding the shaft 190 is a sleeve 191 which is driven from the shaft 190 through a variable speed mechanism and which has attached at its lower end a pinion 192, this driving mechanism as so far described being the same as in the machine of Patent No. 1,834,471. From the pinion 192 the pattern cam shaft for controlling the position of the jack is driven through a train of gears comprising a gear 194 meshing with the pinion 192, an overrunning clutch 196 contained within the gear, a sleeve 198 on which the gear is supported and to which one member of the clutch is keyed, a gear 200 keyed at the lower end of the sleeve, a gear 202 meshing with the gear 200 and secured to the lower end of a short vertical shaft 204, an elongated pinion 206 fast on the shaft 204, a gear 208 meshing with the pinion 206 and a series of similar gears 210 secured together and to the gear 208, arranged to mesh with a gear 212 at the upper end of the pattern cam shaft. The pattern cam shaft is thus driven continuously so long as the driven clutch member 38 engages the main driver 18, the speed of rotation depending on the adjustment of the variable speed mechanism between the shaft 190 and the surrounding sleeve 191. This variable speed mechanism, as in the machine of Patent No. 1,834,471, comprises a ratchet wheel 214 fast upon the shaft 190, a series of pawl carriers 216 pivotally mounted on the upper end of sleeve 191, a pawl 218 mounted on each pawl carrier and spring pressed into engagement with the ratchet 214 and an adjustable cam plate 220 (see Fig. 2) provided with a cam groove, engaging pins 222 projecting upwardly from the pawl carriers.

The mechanism for automatically initiating the final stopping movements of the machine is actuated from the pattern cam shaft, indicated at 224, after it has made nearly a complete revolution. This mechanism acts to release the lock bolt 50 and permits it to move into engagement with the cam slot 48 of the main clutch member 38 and is substantially the same as the mechanism disclosed in Patents No. 1,791,176 and No. 1,834,471. This mechanism (see Figs. 2, 5, 6, and 7) comprises the gear 212 at the upper end of the pattern cam shaft and a block 226 secured to the upper surface of the gear, which block, after the pattern cam shaft has made nearly a complete revolution, engages and swings backwardly a pawl lever 228, and through the pawl moves a lever 230 pivotally mounted at 232 on the machine frame. A sliding rod 234 is pivotally connected at its rear end to the lever 230 and at its forward end is arranged to engage the end of a dog 236 pivotally mounted at the left hand end of a lever 238. The arrangement of these parts is such that as the pattern cam shaft nears the end of a revolution the lever 230 is rocked, the rod 234 is moved longitudinally towards the front of the machine and the lever 238 is swung forwardly at its left hand end about its pivot. The right hand end of the lever 238 is connected by means of a slotted link 242 to the left hand end of another short centrally fulcrumed lever 244. The right hand end of the short lever is provided with a V-shaped recess in which the lower wedge shaped end of a vertical sliding control bar 246 rests (see Figs. 6 and 7). When the left hand end of lever 238 is moved forwardly, the right hand end containing the V-shaped recess of the short lever 244 is actuated to raise the vertically sliding control bar 246. As fully illustrated and described in Patent No. 1,791,176, connections to the control bar include a step-by-step timing device and a snap switch 248 having an actuating arm or lever 250 adapted to be actuated by an off-center spring 252 in one direction or the other according to the position of the clutch controlling mechanism. The switch is operated during the first movement of the control bar and electrical connections are made to the motor 14 to reduce its speed during the next three cycles of operation of the stitch-forming devices. The control bar is given a step-by-step upward movement in time with the rotation of the sewing cam shaft until the upper end of the bar strikes the latch 160, releasing the fingers 142 holding the lock bolt 50 out of engagement with the cam slot 48 on the main driven clutch member. At the same time, the latch 58 is allowed to rise by upward movement of the clamp block 158 on the link 148 connected with the retracting fingers 142. The entry of the lock bolt 50 within the cam slot 48 causes the driven clutch member to become disengaged from the main driver and wedged within the braking member 46 to arrest the movement of the main sewing cam shaft. The control bar 246 upon releasing the latch 160 is itself released from the step-by-step mechanism and returned to its lowest position in engagement with the V-shaped end of the short lever 244 which, during the final movements of the machine, has been restored to its neutral position. The control bar 246 may also be raised to stop the machine by a manually operable lever 254 (see Fig. 7) pivoted on the frame of the machine.

The jack and its supporting structure are substantially the same as in the machine of Patent No. 1,834,471, more fully described in U. S. Patent to Laurence E. Topham and Alfred R. Morrill No. 1,616,714, dated February 8, 1927, and in applicant's co-pending application above referred to. The jack comprises a toe supporting arm 256 (see Fig. 1) rigid with the hollow spindle 258 and a heel supporting arm 260 pivoted at its lower end upon the upper end of the spindle. The jack support comprises a horizontal arm 262 (see Figs. 2, 3, 8, and 9) in the forward end of which the lower end of the jack spindle is rotatably mounted by means of a gimbal joint. The arm 262 is mounted by means of pivotal connections 264 to swing vertically upon a support 266, and the support 266 is pivotally mounted upon substantially vertical hollow bearing surfaces 268 and 270 carried by a frame 272 which is pivotally mounted on the main base 2 of the machine by horizontal bearings 274.

During the sewing operation, tipping and rotating movements are imparted to the shoe to maintain the shoe at all times in proper position, tipping movements being imparted by moving the lower end of the jack spindle forwardly and rearwardly of the machine, and laterally, and rotating movements being imparted by rotating the jack about the axis of the spindle. With the exception of the arrangement of the cable through which the jack spindle is related, the mechanisms for producing these movements are substantially the same as in the machines of the patents above referred to. For moving the lower end of the jack forwardly and rearwardly, a cam lever 276 is provided, one arm of which is pivotally connected to the frame 272 by means of a link 278 and the other arm of which is arranged to engage one of the cams on the pattern cam shaft. The lateral movements of the lower end of the jack spindle are produced by oscillating the support 266 about its vertical bearings, the lower end of which support is provided with a forwardly projecting arm 280 which is connected by means of a link 282 to one arm of a lever 284, the other arm of which is engaged by a cam on the pattern cam shaft. To rotate the jack spindle, a helically grooved drum 286 is provided, having a downwardly extending pivot pin 288 journaled in the outer end of the horizontal arm 262 and the jack spindle is connected to the drum 286 through the gimbal joint above referred to. The drum is rotated by a cord or cable 290 wound substantially one and a half times around the drum and lying in the groove of the drum and secured against slippage by a clamp 292. From the drum one end of the cable passes over a pulley 294 on the base of the machine to a pulley 296 on a weight 298, and thence over a series of pulleys, as in the machine of Patent No. 1,834,471 to a control lever 300 hereinafter described.

In the other direction, the cable passes rearwardly from the drum within enclosing flanges formed on the arm 262 and around a horizontally arranged sheave 302 on the arm, the iner circumferential portion of which sheave, according to a feature of the invention, lies substantially tangent to the axis of the pivotal connections 264. The cable, after passing from the horizontal sheave, is guided by an approximately vertically arranged sheave 304 rotatable on the support 266 and arranged with a portion of its inner circumference also tangential to the axis of the pivotal connections 264. The cable extending from the sheave 304 passes through the centers of bearings 268 and 270 and under a third sheave 306 mounted on bearings in the frame 272. The sheaves 304 and 306 are positioned so that the portion of the cable extending between them passes substantially through the axis of rotation of the vertical bearings. The cable passes from the sheave 306 and around a fourth sheave 308 also carried by the frame 272 and having a portion of its inner circumference approximately tangent to the axis of the horizontal bearings 274 fixed on the main frame of the machine. The cable, after passing from the sheave 308 is secured to a wheel 310 level with the horizontal bearings 274 and attached at the bottom end of a shaft 312 having its upper and lower ends mounted on bearings 314 and 316, respectively, upon the frame of the machine. The wheel 310 is so arranged that the cable will extend tangentially from it to sheave 308. The upper end of the shaft 312 is provided with a pinion which meshes with a segmental rack 318 on the outer end of a lever 320, the other end of which lever is engaged by a cam on the pattern cam shaft (see Fig. 3). By thus arranging the sheaves 302, 304, 306, and 308, and so that portions of the spindle rotating cable 290 pass in substantial alignment or coincident with the respective axes of the pivot bearings of the members of the jack supporting structure relative movements of the different members in no way affect the length of cable between the grooved wheel and the actuated end of the cable. For this reason, other jack positioning movements do not interfere with the rotation of the jack. The use of the helically grooved drum at the lower end of the jack rotating spindle also insures free and easy rotation of the jack about the axis of the spindle without irregular movements from interference between overlapping turns of cable.

Mechanism similar to that illustrated and decribed in Patents No. 1,616,714 and No. 1,834,471 is provided in the illustrated machine for adjusting the speed of the pattern cam shaft in accordance with the size of the shoe to be operated on. To this end the cam plate 220 (see Fig. 2) for controlling the movement of the pawl carriers 216 of the variable speed mechanism is pivotally mounted upon the frame of the machine and provided at its free end with a toothed segment portion meshing with a correspondingly toothed segment 322 also pivotally mounted upon the frame of the machine. The segment 322 is actuated by an arm 324 movable with the segment and attached at its outer end to one end of a controller bar 326 acting when moved endwise in either direction to shift the cam plate 220. Movement is imparted to the controller bar by engagement of a pin 328 on a forward extension of a lever 330 with one of two inclined surfaces formed on the end of the bar 326 remote from the arm 324. The lever 330 is adjusted in accordance with the position given to the shoe in moving the jack into operating position with relation to the stitch-forming devices preliminary to starting the machine, as fully explained in the patents above referred to. In starting the machine, the controller bar 326 is moved bodily into engagement with the pin 328 through the action of a link 332 pivotally connected at one end to the controller bar and at the other to a lever 334 fulcrumed on the frame of the machine. As the lever 334 is rotated about its fulcrum point and the controller bar is moved into contact with the pin 328, the lever 334 is latched in position by engagement of a projection on the lever with a latch 336.

In the illustrated machine, the lever 334 for changing the speed adjustment of the pattern cam shaft is operated from connections to the power starting mechanism in starting the machine in operation. For this purpose, the slide 138 (see Figs. 6 and 7) connected with the crank shaft 68 on the power starting mechanism is formed at its lower end with rack teeth 338 engaging a pinion 340 rotating on a stud shaft fixed to the frame of the machine. The pinion 340 is attached to rotate with a gear 342 meshing with a second rack 344 on the end of a rod 346 slidable horizontally across the front of the machine base. The rod is normally tensed toward the left hand side of the machine by a spring 348 (see Fig. 2) fastened at one end to the rod and at the other to the frame. Adjacent an extension of lever 334 there is provided an upwardly extending pin 350 which engages the lever when the rod 346 is moved towards the right. Operation of the slide 138 from the power starting mechanism causes rotation of the gear 342 and movement of the rod 346 to the right, rocking the lever 334 to latched position and providing the proper adjustment for the speed of the pattern cam shaft in accordance with the size of a shoe.

As in the machines of Patents Nos. 1,834,471 and 1,616,714, the shoe is fed in the present machine by the devices of the sewing mechanism acting directly on the shoe. In order to maintain the shoe in time with the position changing movements imparted to the shoe from a pattern cam shaft, an improved mechanism has been provided for coordinating the movements imparted to the jack by the pattern cam shaft with the feeding movements imparted by the sewing mechanism. This improved mechanism comprises the control lever 300 mounted at 351 on the base of the machine frame to swing in a horizontal plane and connected at its forward end through a lost motion device and a link 352 to the toe supporting arm 256 of the jack. For moving the control lever 300, the central part is connected by means of links 354 and 356 to the end of an arm 358 which is operable with a cam lever 360 engaging a cam on the pattern cam shaft. The links 354 and 356 are pivotally connected together and to the free end of a swinging guiding link 362. The link 362 is fulcrumed upon a lever 364 which is held locked in position during the operation of a shoe. To adapt the machine for operation on shoes of different sizes, the lever 364 is pivotally mounted at its forward end upon the machine base so that it can be adjusted to change the position of the fulcrum of the swinging guiding link 362. The fulcrum carrying lever 364 is held locked in adjusted position during the operation on the shoe by mechanism comprising a rod 366 pivotally connected to the rear end of the fulcrum carrying lever 364 and arranged to slide in a block pivotally mounted on the machine base. The rod 366 is engaged by the inner cam shaped ends of short levers 368 mounted in the block and the outer ends of these levers are connected by a pin and slot connection with a cross bar 370. This cross bar is pivotally mounted on the rear end of a rod 372, the forward end of which is pivotally connected to the central part of the controller bar 326. Rotation of the lever 334 during operation of the power starting mechanism in starting the machine moves the controller bar 326 and the rod 372 forwardly of the machine to lock the rod 366 in fixed position. The placing of a new shoe on the jack in operating position in the machine acts to release the lever 334, as explained in Patent No. 1,616,714, above referred to, so that the fulcrum carrying lever 364 is unlocked and adjustment of the mechanism for actuating the control lever can again be made by the movement of a newly jacked shoe to starting position in the machine.

The lost motion device between the control lever 300 and the link 352 comprises a small lever 374, the hub of which extends on either side of a lug 376 on the control lever through which lug a pivot pin 378 is fitted (see Figs. 11, 12, and 13). The lever 374 extends slightly to one side and forwardly from its pivot and is pivotally connected to the link 352 leading to the toe of the jack. On the opposite side of its pivot, an extending arm of the lever 374 is arranged to oscillate between two adjustable set screws 380 and 382 threaded into lugs carried by the forward end of the control lever. An insulating member 384 is mounted on a horizontal pivot 386 in a recess formed in the lever 374, and carries an electric switch contact 388 for wiping two stationary contacts 390 and 392 mounted in insulating material at the end of the control lever 300. The contact 392 is made shorter than the contact 390 so that in one position with the lever 374 against the set screw 380 no conductive connection exists between the contacts but, when the lever 374 is thrust against the set screw 382, a circuit will be completed. Opening or closing of the circuit containing contacts 390 and 392 acts to vary the rotary speed of the pattern cam shaft through the gear train connecting it to the main driven clutch member, as will be described.

The train of gears, above described, for driving the pattern cam shaft from the main driven clutch member is proportioned to cause the forward end of the lever 300 to move at a slightly slower rate than the toe portion of the jack as it is moved under the feeding action of the stitch-forming devices on the shoe. The difference in movement of these two parts reacts on the small lever 374, rotating it about its pivot pin to close an electric circuit connected between the contacts 390 and 392. This circuit, illustrated diagrammatically in Figure 11, comprises a flexible cable 393 carried by the control lever 300 and provided with wires connected to the contacts 390 and 392. Closing the circuit between contacts 390 and 392 energizes an electromagnet 394, the armature of which acts to produce a change in the gearing through which the pattern cam shaft is driven. This gearing comprises a gear 396 loosely mounted to turn freely on a shaft 398 keyed to the sleeve 190 and on which shaft the low speed driving pinion 192 is fixed (see Fig. 10). Longitudinal displacement of gear 396 is prevented by set screws 400, threaded into the gear 396 and arranged with their inner ends extending into an annular groove 402 in the surface of the shaft 398. The gear 396 meshes with a gear 404 rotating with the sleeve 198 and the ratio of teeth between these gears is such that when the gear 404 is driven by the gear 396, a greater movement of sleeve 198 is produced than by a corresponding rotation of pinion 192 and the gear 194. The gear 404 is provided with a ring 406 having an inner conical frictional surface adapted to be engaged by the face of a correspondingly shaped member 408 keyed to the sleeve 198 and against which the ring is forced by a spring 410. The frictional engagement between he inner face of the ring 406 and the conical member 408 is normally sufficient to drive the sleeve against normal operating resistance but permits the gear 404 to rotate with relation to the sleeve 198 sufficiently to absorb the shock when he gear is put into operation. Movements produced by the pinion 192 and the gear 396 do not interfere on account of the overrunning action of the clutch 196 which permits the sleeve 198 to rotate faster when driven by the gear 404. The gear 396 is adapted to be rotated by a clutch member 412 sliding on the shaft 398 which is rotated from the short vertical shaft 186 driven from the main clutch. The member 412 is fixed to rotate with the shaft by a pin 414 extending diametrically through the member and through longitudinal slots in the shaft. The upper surface of the sliding member and the lower surface of the gear 396 are serrated with inter-engaging projections to establish a driving relation. The sliding clutch member 412 is moved into and out of engagement with the gear 396 by the movement of the armature of the magnet 394 through connections which comprise a split cylindrical block 416 fitting within a longitudinal hole in the shaft 398. The pin 414 passes through this block and thus connects the block with the clutch member. The magnet 394 is mounted directly below the shaft 398 on a bracket 418 and the armature of the magnet carries a short vertical rod 420 extending upwardly from the armature core of the magnet. The block 416 is provided with a recess surrounding the head of a pin 422 threaded at its lower end in a block 424 clamped on the upper end of the vertical rod 420. A spring 426 surrounds the pin 422 and is interposed between the block 424 and the lower end of the cylindrical block 416. The construction and arrangement of these parts are such that a movement of the armature of the magnet 394 when the magnet is energized forces the clutch member 412 yieldingly into engagement with the gear 396, and a movement of the armature in the opposite direction when he magnet is de-energized, moves the clutch member out of engagement with the gear.

The circuit of the magnet 394 is energized to increase the speed of rotation of the pattern cam shaft from a source of power 428 (see Fig. 11) through relay contacts 430 and through connections to the coils surrounding the armature of the magnet. Contacts 430 are connected to energize the magnet 394 by a relay coil 432 connected to one terminal of a low voltage transformer 434 and to the contact 390 mounted on the control lever 300. The contact 392 is connected to the other terminal of the transformer. High voltage connections between the transformer and the source of power 428 serve to furnish current to actuate the relay. The transformer 434 and the relay 432 are mounted in a box 436 attached to the side of the machine base, connecting wires being carried in flexible metal conduits. Connection between the contacts 390 and 392 is interrupted as soon as the control lever 300 has caught up with the feeding movements of the stitch forming devices and the change speed gear is shifted back again to low speed by deenergizing the magnet 394. This shifting continues throughout the stitching operation in accordance with the variations in movement between the shoe supporting jack and the control lever, the relative periods of low and high speeds providing sufficient range of speed variation.

The illustrated machine is also provided with mechanism which may be thrown into operation by the operator after the sewing mechanism and pattern cam mechanism are stopped to turn the pattern cam shaft backwardly. This mechanism is the same as that disclosed in Patent No. 1,616,714, and is thrown into operation by rocking a lever 438 (see Fig. 7) in a direction to depress a clutch block 440 (see Fig. 14). In the present machine, however, the lever 438 is rocked manually instead of automatically as in the patented machine. The means for thus rocking lever 438 consist of a manually operable bell crank lever 442 pivoted at 444 on the machine frame and having one arm formed as a handle and the other arm forked to engage the outer end of the lever 438. The clutch block 440, being rotated continuously, is forced against a serrated block 446 connected with a gear 448 (see Fig. 10) meshing with pinion teeth 450 on the upper end of sleeve 198. The rotation imparted by block 440 is in the proper direction to rotate the pattern cam shaft 224 reversely whenever bell-crank lever 442 is actuated.

The nature and scope of the present invention having been indicated, and a machine embodying the several features having been specifically described, what is claimed is:—

1. A starting apparatus for power operated machines having, in combination, a continuously rotating driving member, a main driven shaft, a main clutch having driving and driven parts for rotatably connecting said driving member and driven shaft, a braking surface rotating with the shaft, a stationary cooperating braking surface, mechanism actuated by the shaft for separating the clutch parts and forcing the braking surfaces into engagement, an auxiliary shaft, an auxiliary clutch for rotatably connecting said driving member and auxiliary shaft, a manually actuable member for rendering the auxiliary clutch operative, connections actuated by the auxiliary shaft for releasing said main clutch parts and braking surfaces to permit the separation of the braking surfaces and the engagement of the main clutch parts, and means acting automatically thereafter to render the auxiliary clutch inoperative.

2. A starting apparatus for power operated machines having, in combination, a continuously rotating driving member, a main driven shaft, a main clutch having driving and driven parts for rotatably connecting said driving member and driven shaft, a braking surface rotating with the shaft, a stationary cooperating braking surface, means actuated by the shaft for separating the clutch parts and forcing the braking surfaces into engagement including a vibrating member and means driven by the shaft and cooperating with said member when held from vibration to move said brake members into engagement, a latch for holding the said vibrating member against movement, an auxiliary shaft, an auxiliary clutch for rotatably connecting said driving member and auxiliary shaft, a manually actuable member for controlling the auxiliary clutch, and connections actuated by the auxiliary shaft for actuating the latch to release the vibrating member.

3. A starting apparatus for power operated machines having, in combination, a continuously rotating driving member, a main driven shaft, a main clutch having driving and driven parts for rotatably connecting said driving member and driven shaft, a braking surface rotating with the shaft, a stationary cooperating braking surface, a cam rotating with the shaft, a lever arranged to be vibrated by the cam and cooperating with the cam when held from vibration to separate the clutch parts and force the braking surfaces into engagement, a latch for holding the lever from vibration, an auxiliary shaft, an auxiliary clutch for rotatably connecting said driving member and auxiliary shaft, a manually actuable member for controlling the auxiliary clutch, and connections actuated by the auxiliary shaft for actuating the latch to release the lever.

4. A starting apparatus for power operated machines having, in combination, a continuously rotating driving member, a main driven shaft, a main clutch having driving and driven parts for rotatably connecting said driving member and driven shaft, a braking surface rotating with the shaft, a stationary cooperating braking surface, a cam rotating with the shaft, a lever arranged to be vibrated by the cam and cooperating with the cam when held from vibration to separate the clutch parts and force the braking surfaces into engagement, a cam follower mounted on the lever to move into and out of engagement with the cam, a latch for holding the lever from vibration, an auxiliary shaft, an auxiliary clutch for rotatably connecting said driving member and auxiliary shaft, a manually actuable member for controlling the auxiliary clutch, and connections actuated by the auxiliary shaft for actuating the latch to release the lever and for retracting the cam follower from engagement with the cam.

5. A starting apparatus for power operated machines having, in combination, a continuously rotating driving member, a main driven shaft, a main clutch having driving and driven parts for rotatably connecting said driving member and driven shaft, a stationary brake arranged adjacent the driven part of the main clutch, a spring for maintaining the clutch parts in engaging relation, means operated by the driven shaft while rotating under momentum for thrusting the driven clutch part away from the driving part and into progressively increasing frictional engagement with the brake member, and a releasing mechanism for said thrusting means comprising an auxiliary clutch driven by said driving member and a manually actuable member for rendering the auxiliary clutch operative, and means acting automatically to render the auxiliary clutch inoperative after said thrusting means has been released.

6. A starting apparatus for power operated machines having, in combination, a continuously rotating driving member, a main driven shaft, a clutch having driving and driven parts acting under the influence of a spring for rotatably connecting said driving member and said driven shaft, a locking bolt acting in its advanced position to maintain the clutch parts separated against the action of said spring, means for retaining the locking bolt after being withdrawn, and means for withdrawing said locking bolt comprising said continuously rotating driving member, an auxiliary driving clutch, a manually actuable member for rendering said auxiliary clutch operative, and means acting automatically to render the auxiliary clutch inoperative after the locking bolt has been withdrawn.

7. A shoe machine having, in combination, a continuously rotating driving shaft, a main driven shaft, a clutch for rotatably connecting said driving shaft and driven shaft, a controlling mechanism for said clutch, means for operating upon a shoe, a shoe supporting jack movable to transfer the point of operation along the shoe, a pattern cam shaft, connections adjustable according to the size of a shoe between the jack and the pattern cam shaft for controlling the position of the jack with relation to the operating means, devices for locking said connections in adjusted position, auxiliary power operated mechanism for actuating the clutch controlling mechanism for rendering the clutch operative to connect the driving and driven shafts and for actuating said locking devices to lock said connections in adjusted position, and a manually operable member for controlling said auxiliary mechanism.

8. A shoe machine having, in combination, means for operating upon a shoe, a shoe supporting jack movable to transfer the point of operation along the shoe, means for controlling the position of the jack with relation to the operating means, a main driver for the machine, a clutch for connecting and disconnecting said operating and jack controlling means with said main driver, apparatus driven through the clutch for disconnecting the operating and jack controlling means subsequently to a predetermined movement of the jack with relation to the operating means, auxiliary mechanism driven by said main driver for actuating the clutch to connect the operating and jack controlling means with the driver, and a manually actuable member for controlling the operation of the auxiliary mechanism.

9. A shoe machine having, in combination, means for operating upon a shoe having a main operating shaft, a shoe supporting jack movable to transfer the point of operation along the shoe, a pattern cam shaft for controlling the position of the jack with relation to the operating means, a main driver for the machine, means including an auxiliary mechanism driven by said main driver for connecting said operating and pattern cam shafts to said main driver, a manually actuable member for controlling said auxiliary mechanism and a manually shiftable element for disconnecting one of said shafts from said driver while the other shaft remains connected in driving relation.

10. In a shoe machine, the combination of means for operating upon a shoe, a main operating shaft therefor, a shoe supporting jack, a pattern cam shaft for controlling the position of the jack with relation to the operating means, a main driver for the machine, means including an auxiliary mechanism driven by said main driver for connecting said operating and pattern cam shafts to said main driver, a manually actuable member for controlling said auxiliary mechanism, and a manually shiftable element for disconnecting said operating shaft from said driver while said pattern cam shaft remains connected.

11. In a shoe machine, the combination of means for operating upon a shoe having a main operating shaft, a shoe supporting jack, a pattern cam shaft for controlling the position of the jack with relation to the operating means, a main driver for the machine, means including an auxiliary mechanism driven by said main driver for connecting said operating and pattern cam shafts to said main driver, a manually actuable member for controlling said mechanism, a manually actuable member for disconnecting said operating shaft from said driver, a reverse drive gear for the pattern cam shaft, and an additional manually actuable member for coupling said reverse drive gear to the pattern cam shaft.

12. A shoe machine having, in combination, means for operating upon and feeding a shoe, a shoe supporting jack, a pattern cam shaft and connections for changing the relative positions of the jack and the operating means to present the shoe properly to the operating means as the point of operation is transferred about the shoe, a driving shaft connected to said pattern cam shaft through an overrunning clutch, disconnectible supplemental gearing between said driving shaft and pattern cam shaft for changing the speed of rotation of said pattern cam shaft, and means for coupling and uncoupling said shafts through said supplemental gearing to maintain the proper time relation between the movements imparted to the shoe by the shoe feeding means and the pattern cam shaft.

13. A shoe machine having, in combination means for operating upon and feeding a shoe, a shoe supporting jack, a pattern cam shaft and connections for changing the relative positions of the jack and the operating means to present the shoe properly to the operating means as the point of operation is transferred about the shoe, a driving shaft connected to said pattern cam shaft through an overrunning clutch, disconnectible supplemental gearing between said driving shaft and pattern cam shaft for changing the speed of rotation of said pattern cam shaft, a shock absorbing device arranged in said gearing, clutch members having inter-engaging serrations for coupling said shafts through said gearing, and means for actuating said clutch members to maintain the proper time relation between the movements imparted to the shoe by the shoe feeding means and the pattern cam shaft.

14. A shoe machine having, in combination, means for operating upon and feeding a shoe, a pattern cam shaft and connections for changing the relative positions of the jack and the operating means as the point of operation is transferred about the shoe, a driving shaft connected to said pattern cam shaft, disconnectible supplemental gearing between said driving shaft and pattern controlling shaft for changing the speed of rotation of said pattern controlling shaft, an arm under the control of said pattern controlling shaft movable with said jack, connections between said movable arm and jack, an electric switch having movable elements interposed between said connections, an electromagnet arranged in a circuit controlled by said switch, and a connection between said gearing and electromagnet actuable to change the speed of rotation of said pattern cam shaft upon operation of said switch by coupling said driving shaft and pattern cam shaft through said supplemental gearing.

15. A shoe machine having, in combination, means for operating upon a shoe, a main operating shaft for said operating means, a movable shoe supporting jack, means for feeding the shoe, mechanism for changing the relative positions of the shoe and the operating means to present the shoe properly to the operating means as the point of operation is transferred about the shoe, a second rotatable shaft arranged in driving relation to said main operating shaft for driving said position changing mechanism, a main driver common to both said shafts, a clutch for coupling said shafts to the driver, a variable speed driving mechanism for adjusting the relative speeds of said shafts, concurrently with the coupling action of said clutch, a changeable selective gear means for varying the relative speeds of said shafts while rotating, and means for momentarily shifting the selective gear means upon variation of the relative speeds of operation upon the shoe of the operating means and of the position changing mechanism.

16. A shoe machine having, in combination, means for operating upon a shoe, a shoe supporting jack having a spindle arranged for turning movement with relation to the operating means, a supporting structure for the jack spindle mounted for swinging movement about a plurality of axes, and means for turning said jack comprising a cable, different portions of which lie along said axes.

17. A shoe machine having, in combination, means for operating upon a shoe, a shoe supporting jack having a rotary spindle, means for rotating said spindle comprising a flexible cable, a supporting structure for the jack spindle mounted for swinging movement about a plurality of axes and sheaves for guiding the cable having bearings adjacent and perpendicular to the axes of the supporting structure and having portions of their respective peripheries substantially tangential to said axes.

18. A shoe machine having, in combination, means for operating upon a shoe, a rotatable shoe supporting jack, a jack supporting structure comprising a member mounted to swing on a fixed horizontal pivot bearing, a second member mounted on the first member to swing on a vertical pivot bearing and a third member mounted on the second member to swing on a horizontal pivot bearing, means for rotating said jack comprising a cable passing centrally of said bearings, and means for moving the cable.

19. A shoe machine having, in combination, means for operating upon a shoe, a shoe supporting jack having a spindle mounted for rotary movement, a pulley provided with a helical groove connected to said spindle and a flexible cable positioned in said groove for rotating said jack.

20. A shoe machine having, in combination, means for operating upon a shoe, a shoe supporting jack having a spindle mounted for rotary movement, a pulley provided with a helical groove connected to said spindle, a flexible cable surrounding said pulley and lying in said groove, yielding means acting on one end of the cable, a jack control shaft for rotating the jack against the force of said yielding means, and means actuated by said control shaft acting on the other end of the cable.

21. A shoe machine having, in combination, a continuously rotating driving shaft, a main driven shaft, a clutch for rotatably connecting said driving shaft and driven shaft, a controlling mechanism for said clutch, means for operating upon a shoe, a shoe supporting jack movable to transfer the point of operation along the shoe, a pattern cam shaft, driving connections between the cam shaft and the operating means, means for adjusting the relative speeds of the operating means and cam shaft according to the size of a shoe, auxiliary power operated mechanism for actuating the clutch controlling mechanism to connect the driving and driven shafts and to actuate the speed adjusting means, and a manually operable member for controlling said auxiliary mechanism.

22. A shoe machine having, in combination, a continuously rotating driving shaft, a main driven shaft, a clutch for rotatably connecting said driving shaft and driven shaft, a controlling mechanism for said clutch, means for operating upon a shoe, a shoe supporting jack movable to transfer the point of operation along the shoe, a pattern cam shaft, connections adjustable according to the size of a shoe between the jack and the pattern cam shaft for controlling the position of the jack with relation to the operating means, devices for locking said connections in adjusted position, driving connections between the cam shaft and the operating means, means for adjusting the relative speeds of the operating means and cam shaft according to the size of a shoe, auxiliary power operated mechanism for rendering the clutch operative to connect the driving and driven shafts and for actuating the locking devices and adjusting means, and a manually operable member for controlling said auxiliary mechanism.

23. A shoe machine having, in combination, means for operating upon a shoe, a rotatable shoe supporting jack, a jack supporting structure comprising a member mounted to swing on a fixed horizontal pivot bearing, a cable arranged when withdrawn to rotate the jack, a wheel to which the cable is secured at a suitable level to extend tangentially towards the axis of the jack bearing, and means for rotating the wheel to withdraw the cable.

24. A shoe machine having, in combination, means for operating upon a shoe, a rotatable shoe supporting jack, a jack supporting structure comprising a member mounted to swing on a fixed horizontal pivot bearing, other jack supporting members mounted successively upon one another to permit proper relative positioning movements of the jack and operating means, a cable passing centrally of the points of connection between said members and connected to rotate said jack, a wheel to which the cable is secured at a suitable level to extend tangentially towards the axis of the fixed bearing, and means for rotating the wheel to withdraw the cable.

25. A shoe machine having, in combination, means for operating upon and feeding a shoe, a shoe supporting jack, a pattern cam shaft and connections for changing the relative positions of the jack and the operating means to present the shoe properly to the operating means as the point of operation is transferred about the shoe, driving connections between the operating means and the pattern cam shaft including gearing and a clutch for changing the relative speeds of rotation of said shaft and of the operating means, means actuable upon the occurrence of an out of time relation between the feed of the shoe and the position of the shoe as presented to the operating means for actuating the clutch to change the relative speeds of the cam shaft and operating means, and a continuously engaged friction clutch in the driving connections arranged to provide sufficient driving force to rotate the cam shaft against normal operating resistance but to absorb the shock caused by sudden actuation of the speed changing clutch.

26. A shoe machine having, in combination, means for operating upon and feeding a shoe, a shoe supporting jack, a pattern cam shaft and connections for changing the relative positions of the jack and the operating means to present the shoe properly to the operating means as the point of operation is transferred about the shoe, driving connections between the operating means and the pattern cam shaft including gearing and a clutch for changing the relative speeds of rotation of said shaft and of the operating means, means actuable upon the occurrence of an out of time relation between the feed of the shoe and the position of the shoe as presented to the operating means for actuating the clutch to change the relative speeds of the cam shaft and operating means, a friction clutch in the driving connections, and yielding means for maintaining the friction clutch engaged with sufficient force to rotate the cam shaft against normal operating resistance but to absorb the shock caused by sudden actuation of the speed changing clutch.

OTTO R. HAAS.